(12) United States Patent
Wolf-Monheim

(10) Patent No.: US 9,340,085 B2
(45) Date of Patent: May 17, 2016

(54) WHEEL SUSPENSION SYSTEM FOR A VEHICLE

(71) Applicant: Ford Global Technologies, LLC, Dearborn, MI (US)

(72) Inventor: Friedrich Peter Wolf-Monheim, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/051,791

(22) Filed: Oct. 11, 2013

(65) Prior Publication Data

US 2014/0191488 A1    Jul. 10, 2014

(30) Foreign Application Priority Data

Oct. 12, 2012    (DE) .......................... 10 2012 218 641

(51) Int. Cl.
| | |
|---|---|
| *B60G 21/05* | (2006.01) |
| *B60G 11/00* | (2006.01) |
| *B60G 3/02* | (2006.01) |
| *B60G 3/10* | (2006.01) |
| *B60G 7/00* | (2006.01) |
| *B60G 7/02* | (2006.01) |

(52) U.S. Cl.
CPC *B60G 11/00* (2013.01); *B60G 3/02* (2013.01); *B60G 3/10* (2013.01); *B60G 7/008* (2013.01); *B60G 7/02* (2013.01); *B60G 2200/1322* (2013.01); *B60G 2200/462* (2013.01); *B60G 2204/129* (2013.01); *B60G 2204/143* (2013.01); *B60G 2204/148* (2013.01); *B60G 2204/416* (2013.01); *B60G 2206/124* (2013.01); *B60G 2206/13* (2013.01); *B60G 2206/15* (2013.01)

(58) Field of Classification Search
USPC .................. 280/124.106, 124.128, 124.131, 280/124.134, 93.51, 93.511, 93.512, 86.75, 280/86.754, 86.756
See application file for complete search history.

(56) References Cited

U.S. PATENT DOCUMENTS

| | | | | |
|---|---|---|---|---|
| 2,827,303 | A * | 3/1958 | Herbenar | 280/124.136 |
| 3,240,509 | A * | 3/1966 | Pierce | 280/124.134 |
| 4,706,989 | A * | 11/1987 | Iijima et al. | 280/5.524 |
| 5,016,903 | A * | 5/1991 | Kijima et al. | 280/124.134 |
| 5,267,651 | A | 12/1993 | Hughes | |
| 5,267,751 | A * | 12/1993 | Hiromoto et al. | 280/124.151 |
| 6,250,660 | B1 * | 6/2001 | Woo | 280/124.149 |
| 7,934,735 | B2 * | 5/2011 | Kuwabara | 280/124.134 |
| 8,523,209 | B2 * | 9/2013 | Pollmeyer et al. | 280/124.128 |

FOREIGN PATENT DOCUMENTS

| | | |
|---|---|---|
| DE | 102008054670 A1 | 6/2010 |
| EP | 1785335 A1 | 5/2007 |
| EP | 2489430 A1 | 8/2012 |
| WO | WO2007113761 A2 | 10/2007 |

* cited by examiner

*Primary Examiner* — Faye M Fleming
(74) *Attorney, Agent, or Firm* — Burgess Law Office, PLLC; Raymond L. Coppiellie

(57) ABSTRACT

A wheel suspension system of the type including a wheel support. A resilient connecting element connects the wheel support to a vehicle frame element. The resilient connecting element having a wheel support side and a frame element side. At least one joint element connects the wheel support side of the resilient element to the wheel support and at least two rotary joints connect the frame element side of the resilient element to the frame element.

13 Claims, 3 Drawing Sheets

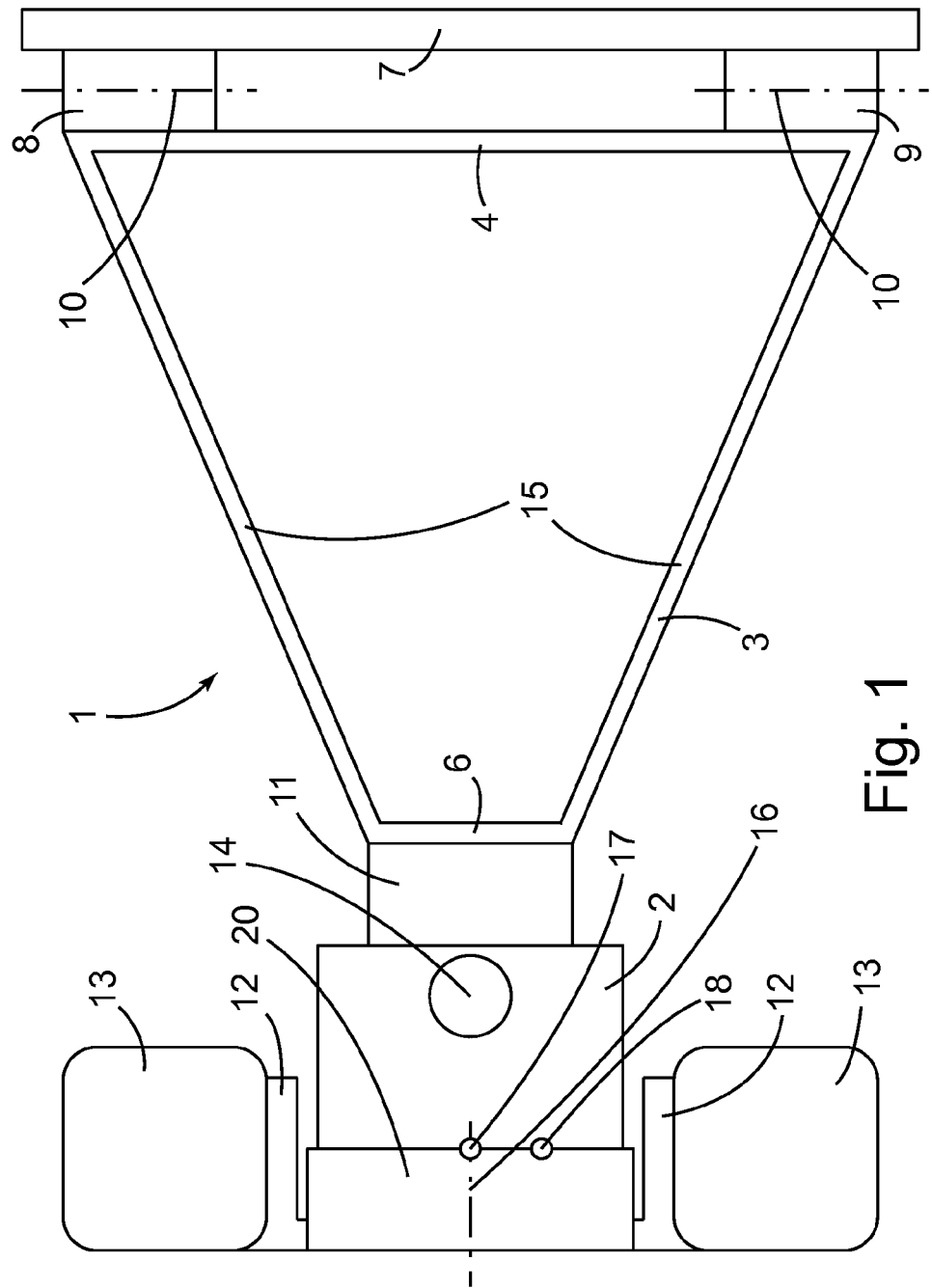

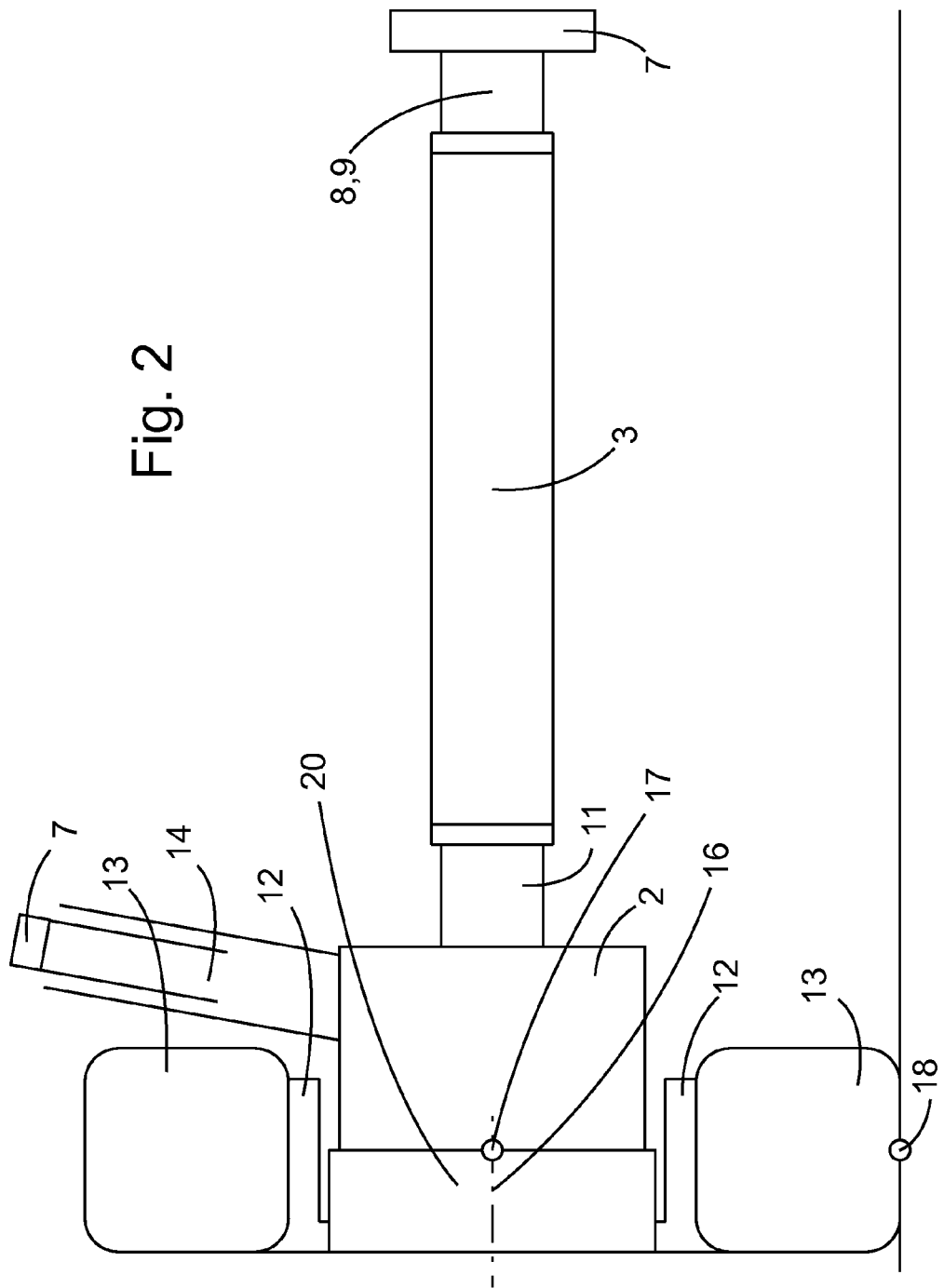

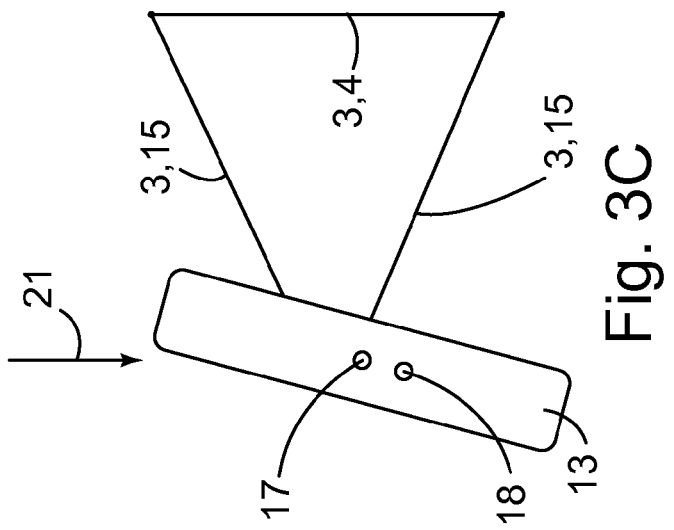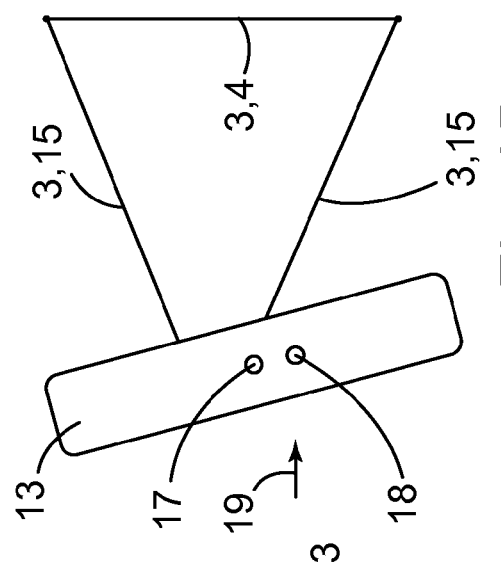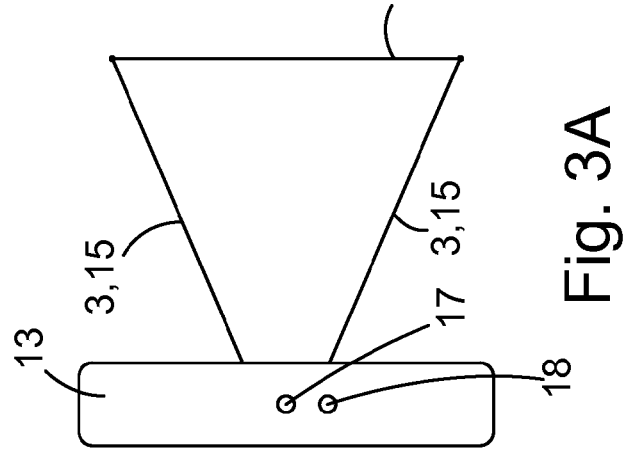

WHEEL SUSPENSION SYSTEM FOR A VEHICLE

CROSS-REFERENCE TO RELATED APPLICATIONS

Not Applicable

BACKGROUND OF THE INVENTION

1. Field of the Invention

The invention relates to a suspension system for a vehicle and, more specifically, to a system for supporting a wheel of a vehicle.

2. Description of Related Art

A vehicle suspension system typically includes a wheel support which receives, supports and enables movable mounting of a vehicle wheel of a motor vehicle. Vehicle suspension systems, that is to say wheel suspension systems, generally have a plurality of links between the frame of the vehicle and the wheel support. The wheel support is connected to the frame of the vehicle, for example, by upper and lower links which form an articulated connection to enable a controlled movement of the wheel in relation to the vehicle body. Shock absorbers and springs are provided, in order to absorb jolts and to make smooth driving possible. Other links which can connect the wheel support to the vehicle include, inter alia, camber arms and toe arms which permit setting of the wheel position. The kinematics of the wheel suspension system therefore define the three-dimensional movement of the wheel during suspension and steering movements and therefore decisively define the driving properties of the motor vehicle in real operation.

Known wheel suspension systems have rigid, that is to say stiff, connecting elements or arms and resilient bearing bushings. These rigid connecting elements provide necessary wheel suspension kinematics, force transmission, steering accuracy, etc. The resilient bearing bushings, known in one example, as rubber/metal bushings serve to set the elasto-kinematic behavior of the wheel suspension system and/or to keep undesired driving noise and vibration transmissions away from a vehicle interior. Here, the rubber body is surrounded by a metallic shell. For example, the resilience can be set by way of the rubber body which can have recesses, such as through holes and/or blind holes and/or closed chambers, but which can also be configured as a solid rubber body without any recesses. However, in interaction with the metal shell, the rubber body has to make the respectively desired compromise possible between agility and stability in the case of each different vehicle. It goes without saying that such resilient bearing bushings do not per se have to assist the compromise, it of course also being possible for further components of the wheel suspension system to be used.

Considerable complexity needs to be undertaken in order to achieve the respectively desired properties by adaptation of the rubber body. In particular, the bearing bushings have to have dimensions which are such that the maximum possible loads can be absorbed.

EP 1 785 335 B1 is concerned with an articulated connection for transmitting a steering movement to a wheel of a vehicle, having a joint device for fastening the wheel, a steering arm which is connected to the joint device and is configured for absorbing the steering movement to be transmitted and transmitting it to the joint device. The steering arm comprises a resilient material, the joint device comprising a different material than the steering arm, and the material of the steering arm being more resilient than the material of the joint device. Here, EP 1 785 335 B1 proceeds from the fact that solutions for achieving a tendency to understeer were based on the use of very soft bushing between the steering gear and subframe, as a result of which a hysteresis was added to the steering system; the measures of EP 1 785 335 B1 led successfully to an improved steering behavior of a vehicle.

EP 2 489 530 A1 describes an adjustable wheel support having a steering arm. The proximal end of the steering arm is connected to the wheel support. In order to provide a wheel support which has an optimum steering behavior which can be adapted to different operating states of the vehicle, EP 2 489 530 A1 proposes that, in a distal section, the steering arm can additionally be connected to the wheel support by means of at least one coupling device, the steering arm having a greater transverse elasticity than the rest of the wheel support.

Accordingly, one object of the present invention is providing a wheel suspension system, in which the dimensions of the bearing bushings can be reduced, and/or in which at least part of the bearing bushings can be dispensed with, with the result being that the wheel suspension system can be produced with reduced weight, less expense and with less complexity.

SUMMARY OF THE INVENTION

One example of the present invention provides a wheel suspension system having a wheel support. The wheel suspension system having a resilient connecting element for connecting the wheel support to a vehicle frame element, the resilient connecting element productively having at least one joint element on its wheel support side and having two rotary joints on its frame side, with the result that the resilient connecting element articulates both on the wheel support and the frame element.

In another example, the resilient connecting element, as viewed in plan view, includes a conical configuration with a base and a cone apex which is arranged so as to lie opposite said base. The top of the cone is preferably truncated forming a frusto-conical shape with a top side opposite the base.

When viewed in plan view, the base has a greater width than the preferably truncated cone apex. The truncated cone apex is expediently configured in such a way that at least one joint element can be arranged on it for connection to the wheel support, it being possible for the base to receive at least the two rotary joints, in order for it to be possible to connect the resilient connecting element to the frame element in a rotationally and/or pivotably movable manner about the rotational axis of the rotary joints.

In a further example, one rotary joint is located in each corner of the base. The rotary joints of the base are preferably arranged in such a way that their rotational axes are congruent with respect to one another.

Another example includes the resilient connecting element formed from an endless material with its base, its cone apex and the flanks forming a hollow body. The resilient connecting element formed from a resilient, preferably elastic material, with the result that a toe change to toe-in or to toe-out is possible depending on the loading. In the case of a lateral force loading which acts on the tire contact patch, a change can take place, for example, that is to say an adjustment of the toe to toe-in or to toe-out. In the case of a longitudinal force loading on the center point of the wheel during acceleration respectively the tire contact patch during braking, a change can likewise take place, that is to say an adjustment of the toe to toe-in or to toe-out.

The wheel suspension system according to the invention can be arranged with the resilient connecting element on a steerable axle or on a non-steerable axle. If the wheel suspension system is arranged on a steerable axle, it is favorable in the context of the invention if the joint element for attaching the resilient element to the wheel support is configured as a ball joint. If the wheel suspension system is arranged on a non-steerable axle, a rotary joint corresponding to the rotary joint of the base can be provided for attaching the resilient connecting element to the wheel support.

Accordingly, the dimensions of the bearing bushings which are used can be reduced, it being possible for bearing bushing to be dispensed with. The wheel suspension system can therefore have its weight reduced, it being possible to manufacture it less expensively. A plurality of resilient connecting elements can of course be used, it being possible, by way of example, for the resilient connecting element according to the invention to replace in each case the upper and lower rigid links with the usually provided bearing bushings.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 shows a diagrammatic illustration of a wheel suspension system according to the present invention in plan view.

FIG. 2 shows the wheel suspension system of FIG. 1 in a front or rear view, and

FIGS. 3A-3C show the wheel suspension system of FIG. 1 in plan view, in different loading states.

DETAILED DESCRIPTION OF THE PREFERRED EMBODIMENTS

The following description of the preferred embodiment(s) is merely exemplary in nature and is in no way intended to limit the invention, its application, or uses.

The disclosed embodiment relates to a wheel suspension system 1 which has a wheel support 2. As set forth herein, the wheel suspension system 1 has a resilient connecting element 3. The resilient connecting element, as viewed in plan view, includes a conical or triangular configuration with a base and a cone/triangle apex which is arranged so as to lie opposite said base. Turning to FIG. 1, there is shown one example of the present invention wherein when viewed in plan view, the resilient connecting element 3 has a conical/triangular configuration with a base 4, a truncated cone/triangle apex or top side 6 which is arranged so as to lie opposite the base 4 and opposing flanks 15 interconnecting the base 4 and cone apex 6. The resilient connecting element 3 can also have other configurations than as described. The resilient connecting element 3 is formed from a resilient, for example elastic material. Resilient, that is to say elastic, in the context of the invention denotes a material which yields under loading and moves back into the original position again when the loading is canceled, for example as shown in FIGS. 3A-3C discussed in further detail. In one example, the resilient connecting element 3 is formed from an endless material, with the base 4, the cone apex 6 and the flanks 15 configured by way of example as a hollow body.

The resilient connecting element 3 connects the wheel support 2 to a frame element 7 of a vehicle, for example a passenger car. Rotary joints 8 and 9 are provided on the frame side which, as seen in FIG. 1, are located at/in each corner of the base 4. Each of the rotary joints 8 and 9 have a rotational axis 10, with the rotational axes 10 being congruent. The rotary joints 8 and 9 permit a rotational or pivoting movement between the resilient connecting element 3 and the frame element 7 about the rotational axis 10. A joint element 11 which can be configured as a rotary joint or as a ball joint is provided on the wheel carrier side. If the wheel suspension system 1 is arranged on a steerable axle, the joint element 11 is favorably configured as a ball joint. If, in contrast, the wheel suspension system 1 is arranged on a non-steerable axle, the joint element 11 is favorably configured as a rotary joint.

A wheel 13 mounted on a rim 12 is arranged on the wheel support 2 and a spring/damper unit 14 supports the wheel support 2 toward the vehicle frame in a usual way. The wheel 13 can be rotated about its rotational axis 16 of the wheel hub 20, with the wheel support 2 being movable relative to the vehicle frame.

A center point 17 of the wheel and a tire contact patch for lateral forces 18 can also be seen in FIG. 1. FIG. 3A shows a neutral position of the wheel suspension system. FIGS. 3B and 3C show different loading states. In FIG. 3B the arrow 19 indicates a lateral force that acts on the tire contact patch 18. As illustrated, the lateral force causes a toe change from the neutral position, see FIG. 3A, to a toe-out position as illustrated in FIG. 3B. In FIG. 3C the arrow 21 indicates a longitudinal force which acts on the wheel center 17. As illustrated the longitudinal force causes a toe change from the neutral position, see FIG. 3A, to a toe-in position as illustrated in FIG. 3C. As illustrated, the flanks 15 yield elastically and therefore the cone apex 6 and flanks 15 move while the position of the base 4 remains unchanged. The base 4 remains in position in a positionally stable manner.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A wheel suspension system for use with a vehicle comprising:
   a vehicle frame;
   a wheel support;
   a resilient element connecting said wheel support to said vehicle frame, said resilient element including a top side, a base and flanks connecting said base to said top side;
   said top side parallel to said base;
   at least one joint element on said top side; and
   at least two rotary joints on said base.

2. A wheel suspension system set forth in claim 1 including:
   said resilient element having an apex positioned opposite of said base and flanks connecting said base and said apex.

3. A wheel suspension system set forth in claim 1 said rotary joints are located at each corner of said base of said resilient element.

4. A wheel suspension system set forth in claim 1 wherein said resilient element has an opening therein.

5. A wheel suspension system set forth in claim 1 wherein said base has a first end and a second end;

a first flank connected to said first end of said base and forming a first corner and a second flank connected to said second end of said base and forming a second corner; and a first rotary joint located at said first corner and a second rotary joint located at said second corner.

6. A wheel suspension system set forth in claim 5 wherein said joint elements are ball joints.

7. A wheel suspension system set forth in claim 5 wherein said joint elements are rotary joints.

8. A wheel suspension system as set forth in claim 1 wherein said flanks are equal in length.

9. A wheel suspension system for use with a vehicle comprising:
- a vehicle frame;
- a wheel support;
- a resilient element connecting said wheel support to said vehicle frame, said resilient element including at top side having a first end and a second end, a base opposite said top side, said base having a first end and a second end;
- said top side parallel to said base;
- a first flank connected on one end to said first end of said base and forming a first base corner and connected on an opposite end to said first end of said top side and forming a first top side corner;
- a second flank connected on one end to said second end of said base and forming a second base corner and connected on an opposite end to said second end of said top side and forming a second top side corner;
- said resilient element having an opening therein, said opening located between said base and said top side;
- a first rotary joint located at said first base corner and a second rotary joint located at said second base corner; and
- at least one joint element located on said top side.

10. A wheel suspension system set forth in claim 9 wherein said first rotary joint located at said first base corner is connected to said vehicle frame and said second rotary joint located at said second base corner is connected to said vehicle frame; and
said joint element located on said top side is connected to said wheel support.

11. A wheel suspension system set forth in claim 10 wherein said joint element is a ball joint.

12. A wheel suspension system set forth in claim 10 wherein said joint element is a rotary joint.

13. A wheel suspension system as set forth in claim 9 wherein said first flank and said second flank are equal in length.

* * * * *